(12) United States Patent
Maltseff et al.

(10) Patent No.: US 7,190,257 B2
(45) Date of Patent: Mar. 13, 2007

(54) DATA ENCODING IN RADIO FREQUENCY IDENTIFICATION TRANSPONDERS

(75) Inventors: Paul August Maltseff, Edmonds, WA (US); H. Sprague Ackley, Seattle, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 10/876,443

(22) Filed: Jun. 24, 2004

(65) Prior Publication Data

US 2004/0257203 A1 Dec. 23, 2004

Related U.S. Application Data

(63) Continuation of application No. 09/270,281, filed on Mar. 16, 1999, now abandoned.

(51) Int. Cl.
*H04Q 5/22* (2006.01)
(52) U.S. Cl. ............... 340/10.51; 340/10.1; 340/568.1; 235/492
(58) Field of Classification Search ............... 340/10.1, 340/10.6, 10.51, 10.31, 568.1, 10.52; 367/2; 235/494, 492; 714/773, 774
See application file for complete search history.

(56) References Cited

U.S. PATENT DOCUMENTS

| | | | | |
|---|---|---|---|---|
| 4,631,708 A | * | 12/1986 | Wood et al. ................... | 367/2 |
| 4,799,059 A | * | 1/1989 | Grindahl et al. ........ | 340/870.03 |
| 4,990,756 A | * | 2/1991 | Hoemann ................... | 235/435 |
| 5,151,684 A | * | 9/1992 | Johnsen ................... | 340/568.1 |
| 5,479,416 A | * | 12/1995 | Snodgrass et al. .......... | 714/785 |
| 5,532,686 A | * | 7/1996 | Urbas et al. ............. | 340/10.51 |
| 5,629,981 A | * | 5/1997 | Nerlikar ..................... | 713/168 |

(Continued)

OTHER PUBLICATIONS

"International Symbology Specification 93i" AIM International, Inc. Oct. 21, 1998.
International Symbology Specification-MaxieCode AIM International, Inc., Nov. 1996.

*Primary Examiner*—Edwin C. Holloway, III
(74) *Attorney, Agent, or Firm*—O'Melveny & Myers LLP

(57) ABSTRACT

A method and apparatus are provided for efficiently encoding source data in radio frequency identification (RFID) systems. The encoded source data may also provide additional functionality such as data error detection and correction. A source data encoding and decoding method for a RFID system having a RFID transponder comprises the steps of obtaining the source data, encoding to provide more efficient data encodation that may also include data error detection and error correction, writing the encoded source data to a RFID transponder, reading the encoded source data from the RFID transponder, and decoding the encoded source data to recover the original source data. The encoding may utilize bar code symbology algorithms or a non-Full ASCII enhanced functionality character set. A source data encoding device and a decoding device for a RFID system may comprise a memory, a processor for running a program stored in the memory, a bar code printer for printing a bar code, a RFID transponder programmer for writing the data to the RFID transponder, a RFID interrogator for interrogating the RFID transponder, and a bar code reader to read a bar code. The data may be provided encoded or the device may encode/decode the data using coding algorithms. The RFID transponder stores the encoded source data, that may utilize a non-Full ASCII enhanced functionality character set, and the encoded data may be retrieved to recover the original source data.

14 Claims, 2 Drawing Sheets

U.S. PATENT DOCUMENTS

| | | | |
|---|---|---|---|
| 5,640,002 A * | 6/1997 | Ruppert et al. | 235/462.46 |
| 5,641,634 A * | 6/1997 | Mandecki | 435/6 |
| 5,642,103 A * | 6/1997 | Tokuda et al. | 340/10.51 |
| 5,757,021 A * | 5/1998 | Dewaele | 250/581 |
| 5,764,774 A * | 6/1998 | Liu | 380/269 |
| 5,811,787 A * | 9/1998 | Schuessler et al. | 235/494 |
| 5,838,253 A * | 11/1998 | Wurz et al. | 340/10.42 |
| 5,850,187 A * | 12/1998 | Carrender et al. | 340/10.6 |
| 6,126,074 A * | 10/2000 | He et al. | 235/454 |
| 6,194,993 B1 * | 2/2001 | Hayashi et al. | 340/10.34 |
| 6,196,466 B1 * | 3/2001 | Schuessler | 235/494 |
| 6,288,629 B1 * | 9/2001 | Cofino et al. | 340/10.1 |
| 6,321,986 B1 * | 11/2001 | Ackley | 235/462.01 |

* cited by examiner

DATA ENCODING IN RADIO FREQUENCY IDENTIFICATION TRANSPONDERS

RELATED APPLICATION DATA

This patent application is a continuation of U.S. patent application Ser. No. 09/270,281, for DATA ENCODING IN RADIO FREQUENCY IDENTIFICATION TRANSPONDERS, filed Mar. 16, 1999, now abandoned.

BACKGROUND OF THE INVENTION

1. Field of the Invention

The present invention relates to radio frequency identification (RFID) interrogators and transponders, and more particularly, to an apparatus and method for RFID transponder data encoding.

2. Description of Related Art

In the automatic data identification industry, the use of RFID transponders (also known as RFID tags) has grown in prominence as a way to track data regarding an object to which the RFID transponder is affixed. An RFID transponder generally includes a semiconductor memory in which digital information may be stored, such as an electrically erasable, programmable read-only memory (EEPROMs) or similar electronic memory device. Under a technique referred to as "backscatter modulation," the RFID transponders transmit stored data by reflecting varying amounts of an electromagnetic field provided by an RFID interrogator by modifying their antenna matching impedances. The RFID transponders can therefore operate independently of the frequency of the energizing field, and as a result, the interrogator may operate at multiple frequencies so as to avoid radio frequency (RF) interference, such as utilizing frequency hopping spread spectrum modulation techniques. The RFID transponders may either be passive, in which they extract their power from the electromagnetic field provided by the interrogator, or active, in which they include their own power source.

Because RFID transponders do not include a radio transceiver, they can be manufactured in very small, light weight and inexpensive units. Passive RFID transponders are particularly cost effective because they lack a power source. In view of these advantages, RFID transponders can be used in many types of applications in which it is desirable to track information regarding a moving or inaccessible object. One such application is to affix RFID transponders to work pieces moving along a conveyor belt of an assembly line. The RFID transponders would contain stored information regarding the particular assembly requirements for the work piece to enable automated equipment to operate on the work piece and perform certain tasks particular to the unique work piece requirements. This way, products having different assembly requirements can be sent down the same assembly line without having to modify the assembly line for each unique requirement. Other applications for RFID technology include asset and inventory control, access control, security, and transportation applications such as vehicle toll collection, parking, and fleet management.

A drawback of conventional RFID systems is that the RFID transponder has limited memory capacity. Data is either encoded as a numeric equivalent of bits or encoded as Full ASCII (American Standard Code for Information Interchange) bytes with 8 bits to a character. Currently, there is no method of compacting variable data or adding functionality to the encoded data.

Another drawback is that errors in the data are sometimes encountered. Static electricity, cosmic radiation, and magnetic or electric fields, to name but a few reasons may cause errors. Currently, there is no method available to detect errors except by comparing data encoded on the tag to the original data. There is also no method available to correct data except by manual methods. In other words, there is no error detection or correction for the stored information within the RFID transponder. Error detection refers to a coding scheme that determines the presence of errors within the data while error correction refers to a coding scheme that corrects an error detected within the data. These coding schemes are referred to as source encoding because they operate upon the original or source data to produce an encoded message for transmission.

A conventional RFID system includes a RFID transponder programmer, a RFID transponder, and a RFID interrogator. The RFID transponder programmer performs the function of programming or writing the data to the RFID transponder. The RFID interrogator performs the function of communicating with the tags and facilitating data transfer. The RFID interrogator may also perform the functions of the RFID transponder programmer and write to the RFID transponder. Known coding schemes, such as Manchester coding or FMO coding, may be employed to communicate between the RFID transponder and the RFID interrogator (or RFID transponder programmer). This application of coding schemes to facilitate effective channel transmission of the data to and from the RFID transponder is referred to as channel encoding. Channel encoding is designed to overcome noise, interference, and distortion caused by the communication channel; however, channel encoding does not protect against errors in the data stored within the RFID transponder. For example, the data within the RFID transponder may become corrupted due to damage to the RFID transponder, electroinagnetic interference, internal electrical circuit or memory failure, etc. The RFID interrogator will correctly read the corrupted data contained within the RFID transponder, but will be unable to discern that the data contains errors. Thus, while transmission checking exists for the read and write process for RFID transponders, there is currently no method to verify that the data contained within a RFID transponder is correct. Consequently, there is no independent or "out-of-channel" verification that the original data traveling through the read/write process arrives at a destination in a fashion identical to its origin.

Accordingly, it would be desirable to provide an apparatus and method for RFID transponder data encoding that would encode variable data more efficiently and provide enhanced functionality to the data encoded in the RFID transponder. The data may be encoded in other than straight Full ASCII bytes. The data may also be encoded to provide error detection and correction. The error detection and correction method would provide source data encoding/decoding to provide data checking and correcting capability to insure data integrity and to improve RFID system performance in the event of data corruption. The method would allow faster "read rates" for increased RFID system performance. The method would be capable of utilizing currently employed symbology checking and correcting algorithms and provide specific schemes to optimize source encoding capability for a given RFID transponder data content and system architecture. Furthermore, an apparatus would be desirable that could utilize such methods and may also combine such features within a bar code reader or a bar code printer. This would allow multiple applications to be supported within one apparatus and existing data encodation and error detection and correction codes from bar code symbology algorithms could be adapted for use with RFID transponders.

SUMMARY OF THE INVENTION

In accordance with the teachings of the present invention, a method and apparatus for RFID transponder data encodation are provided. The method provides data encoding for efficiency and functionality that may include error detection and correction capability to verify source data integrity and to improve RFID system performance in the event of data corruption. The apparatus may utilize such methods and also provide the dual functions of reading or printing bar code symbols and reading or writing to a radio frequency identification transponder.

In a first embodiment of the present invention, a source data encoding and decoding method is provided for a RFID system having a RFID transponder. The method comprises the following steps (1) obtaining the source data, (2) encoding the source data using a predetermined coding scheme to provide efficient data encodation, and (3) writing the encoded source data to the RFID transponder. The method may comprise the additional steps of (4) reading the encoded source data from the RFID transponder and (5) decoding the encoded source data to recover the source data. The second step of encoding the source data may further comprise encoding the source data to enable subsequent data error detection and correction. The method may further comprise a sixth step of writing the encoded source data back to the RFID transponder after data error correction. The predetermined coding scheme may further comprise known bar code symbology algorithms such as 93i, PDF417, Code One, Data Matrix, Aztec Code, QR Code, and MaxiCode. The method may further comprise the step of encoding the source data to include an optimal Galois Field for error correction performance or a non-Full ASCII enhanced functionality character set.

In a second embodiment of the present invention, a RFID transponder is provided having a memory containing data encoded with a non-Full ASCII format. The data may be further encoded from source data using a predetermined coding scheme to provide data error detection or enable subsequent data error correction In a third embodiment of the present invention, a source data encoding device is provided for a RFID system having a RFID transponder. The encoding device comprises a memory and a processor that runs a program stored in the memory, the program comprising the steps of (1) obtaining source data and (2) encoding the source data using a coding algorithm. The coding algorithm may comprise a bar code symbology algorithm or a non-Full ASCII format. The device may further comprise the step of writing the encoded source data to the RFID transponder. The step of encoding the source data may further comprise encoding the source data to enable subsequent data error detection and correction.

In a fourth embodiment of the present invention, a source data decoding device is provided for a RFID system having a RFID transponder. The decoding device comprises a memory and a processor that runs a program stored in the memory, the program comprising the steps of (1) obtaining encoded source data from the RFID transponder and (2) decoding the encoded source data using a coding algorithm. The coding algorithm may comprise a bar code symbology algorithm or a non-Full ASCII format. The step of decoding the encoded source data may further comprise performing data error detection and correction. The step of obtaining the encoded source data may further require verifying that the source data is properly recovered. There may be a further step of writing the encoded source data to the RFID transponder after providing data error correction.

The third and fourth embodiments of the present invention may further comprise a bar code printer, RFID transponder programmer, RFID interrogator, or a bar code reader, coupled to the processor, and adapted to print, write, interrogate, or read, respectively, upon command by the processor.

A more complete understanding of the data encoding method and apparatus for a RFID system will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

Figure 1:
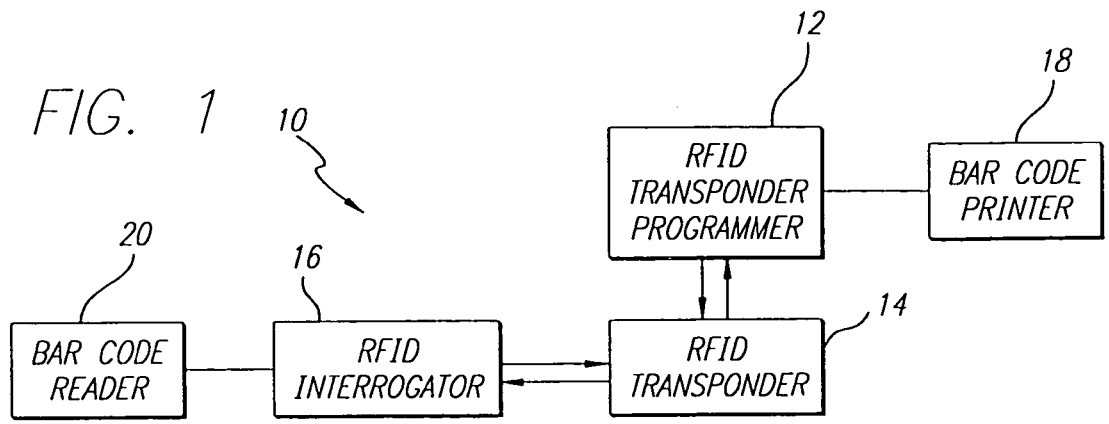
FIG. 1 is a block diagram illustrating an exemplary RFID system in accordance with an embodiment of the present invention.

The present invention satisfies the need for a RFID system that provides RFID transponder data encoding for enhanced efficiency and for functionality such as error detection or correction. The efficient encodation capability would provide improved RFID system performance. The RFID system could be incorporated into a bar code reader having RFID interrogator/programming capabilities or a bar code printer having RFID transponder programming capabilities. Current encoding methods and error detection and correction codes from bar code symbology algorithms could then be adapted for use with RFID transponders, thereby reducing implementation costs and resulting in increased efficiencies and other cost savings. In the detailed description that follows, it should be appreciated that like reference numerals are used to identify like elements illustrated in one or more of the figures.

Referring first to FIG. 1, a block diagram of a RFID system 10 in accordance with an embodiment of the present invention is illustrated. The RFID system 10 comprises a RFID transponder programmer 12, a RFID transponder 14, and a RFID interrogator 16. The main function of the RFID transponder 14 is to store data for later retrieval with one benefit, as discussed above, is that the data can be read at a distance. The RFID transponder 14 is generally used by attaching it to items of interest with the data stored pertaining to the item's identity, related information concerning the item, as well as for other purposes. The RFID transponder 14 stores encoded data using a non-Full ASCII enhanced functionality character set rather than the conventional practice of encoding data in bits or groups of 8 bits (bytes) as in Full ASCII (8 bits per character). The encoded character set can encode data more efficiently and provide additional functionality such as data error detection and correction. As discussed in greater detail below, the source data for the RFID transponder 14 may be encoded according to the known methods of bar code symbologies or by any other non-Full ASCII character set and therefore provide enhanced functionality.

The RFID transponder programmer 12 performs the function of programming or writing the source data into the memory of the RFID transponder 14. RFID transponder programming is generally performed during the manufacturing process such as for write once, read many (WORM) type RFID transponders 14, but may also be performed at a later date or reprogrammed if, for example, the RFID transponder 14 has read/write capability.

The RFID transponder programmer 12 may be incorporated into a bar code printer 18. The combination of the RFID transponder programmer 12 and the bar code printer 18 allows one device to either print bar code symbols (not shown) or write to the RFID transponder 14. This device would have a memory and a processor to run programs stored in memory to control the bar code printer 18 and the RFID transponder programmer 12. The device could receive data and commands and the processor could execute the commands such as to obtain source data stored in memory, run programs stored in memory to encode the source data, and then print a bar code symbol or write to a RFID transponder 14. Alternatively, the RFID transponder programmer 12 and the bar code printer 18 may be separate devices, as shown, but linked, for example by a common memory/data storage device, to achieve similar efficiencies. This combination reduces implementation costs, such as utilizing a common memory and processor, and may further provide efficiencies by utilizing bar code symbology algorithms, as discussed in greater detail below, for encoding the source data.

The RFID interrogator 16 performs the function of interrogating or reading the source data contained within the RFID transponder 14 after it has been programmed by the RFID transponder programmer 12. The RFID interrogator 16 may incorporate the functions of the RFID transponder programmer 12 and thus, provide the ability to read or write to the RFID transponder 14, as known in the art. As discussed above, the RFID interrogator 16 may provide sophisticated channel encoding schemes in order to facilitate effective channel transmission of the data to and from the RFID transponder 14; however, these encoding schemes fail to protect against the possibility that the data within the RFID transponder 14 has been corrupted. Data corruption may occur during the write step, while stored within the RFID transponder 14, or during the read step.

The RFID interrogator 16 may also be incorporated into a bar code reader 20. The combination of the RFID interrogator 16 and the bar code reader 20 allows one device to either interrogate the RFID transponder 14 or read bar code symbols (not shown). This device would have a memory and a processor to run programs stored in memory to control the RFID interrogator 16 and the bar code reader 20. The device could then perform functions such as storing the data being read in memory so that the processor running data decoder algorithms could then decode the data and notify the operator of a successful read. Alternatively, the RFID interrogator 16 and the bar code reader 20 may be separate devices, as shown, but linked, for example by a common memory/data storage device, to achieve similar efficiencies. This combination achieves efficiencies, as above, by reducing implementation costs and allowing the use of data encoding along with common error detection and correction bar code symbology algorithms, as discussed in greater detail below.

It should be understood that the present invention pertains to RFID data encoding, so as to provide efficiencies and functionality such as error detection and correction, and also with the incorporation of the RFID system and the bar code system to achieve certain advantages and efficiencies and that alternative embodiments may be made within the scope of the present invention. By merging the RFID system and the bar code system, one advantage, besides manufacturing cost reductions and associated benefits from having one device perform multiple tasks, is the ability to apply bar code symbology algorithms to provide RFID data encoding and error detection and correction. For example, the RFID transponder programmer 12 and the bar code printer 18 may be combined in a single device, as discussed above. The RFID transponder programmer 12 and the bar code printer 18 may then utilize the same encoding and data error detection and correction algorithms. Similarly, the RFID interrogator 16 and the bar code reader 20 may also be combined in a single device and share the same data encoding and error detection and correction algorithms. Thus, while the elements are shown in FIG. 1 as separate units, they may be further combined within a single device and be within the scope of the present invention to provide a device that can perform all of the functions of the bar code printer 18, the RFID transponder programmer 12, the RFID interrogator 16, and the bar code reader 20. This device would then have a processor to control all of the functions performed such as receiving data and storing in memory, encoding the data using encoding algorithms stored in memory, printing a bar code or writing the data to a RFID transponder, or reading a bar code or interrogating a RFID transponder, and decoding the data.

Figure 2:
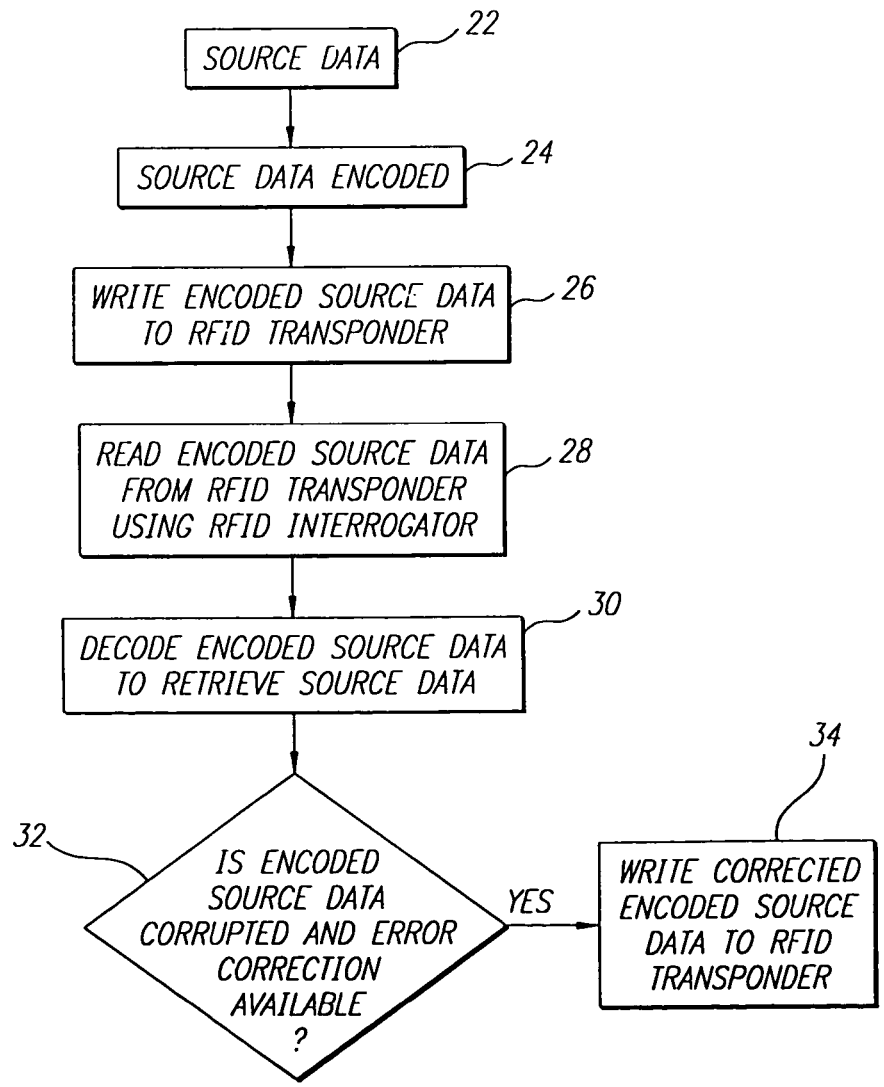
FIG. 2 is a flow chart illustrating a method in accordance with an embodiment of the present invention for providing RFID transponder data encoding that includes error detection and correction.

FIG. 2 is a flow chart illustrating a method in accordance with an embodiment of the present invention for providing RFID transponder data encoding that includes error detection and correction. The source data, shown at step 22, represents the original, unaltered data that is desired to be communicated by the RFID system 10. At step 24, the source data is encoded by applying a coding scheme to the original source data. The coding scheme may comprise any one of various encoding schemes, as generally known in the art of coding. These known coding schemes include bar code symbology algorithms that have source data encoding schemes, discussed in further detail below. The encoded source data is then written to the RFID transponder 14 at step 26. The encoded source data is written by the RFID transponder programmer 12 or by the RFID interrogator 16 if capable of programming, as discussed above. The source data encoding may be performed within the device performing the programming or the source data may be encoded prior to the programming operation.

The RFID interrogator 16, at step 28, reads the encoded source data within the RFID transponder 14. The RFID transponder programmer 12 may also read the encoded source data to verify that the programming was successful. The encoded source data, at step 30, is then decoded to retrieve the source data. Besides performing any channel decoding functions, the RFID interrogator 16 may also perform the decoding of the source data or, alternatively, the decoding of the source data may be performed by a decoder after the RFID interrogator 16 transfers the encoded source data to the decoder but before the user application.

A source data encoding device or an encoded source data decoding device would have a processor that runs programs stored in memory in order to properly encode or decode the source data. A source data encoding device would obtain the source data and apply the proper coding scheme prior to transferring the encoded source data. Similarly, a decoding device that receives the encoded source data must recognize the type of coding scheme and apply the proper decoding algorithm in order to recover the original source data.

Depending upon the specific coding scheme used to encode the data, data error detection and also possibly error correction may be performed upon the data read from the RFID transponder 14. Therefore, after the RFID interrogator 16 reads the data from the RFID transponder 14, the coding scheme will be able to determine whether the recovered data is identical to the original source data. If the encoded source data contains only error detection schemes, then the coding scheme will be able to indicate that the data contains errors. If the encoded source data also contains error correction schemes, then the coding scheme will likely be able to correct the errors contained within the data. Thus, at step 32, if the encoded source data is corrupted, but error correction capability is available, then, if the RFID interrogator 16 has RFID transponder programmer 12 capabilities, the RFID interrogator 16 can write the corrected encoded source data to the RFID transponder 14 at step 34. The likelihood of correcting the data will depend upon the amount of corruption within the data and also on the degree of sophistication of the coding scheme selected. The type of coding scheme selected will be constrained by many factors including the amount of data that the RFID transponder 14 is capable of storing.

There are many coding schemes available, as known in the art, that may be selected to encode the source data. For example, coding schemes utilized for bar code symbology may be adapted for use with a RFID system. Symbology refers to the rules that define the way data is mapped into a printed pattern. Because bar code symbology algorithms that contain source data encoding schemes operate upon the source data to convert the source data into an encoded data format prior to mapping the encoded data format to a bar code pattern, the bar code symbology algorithm can be utilized by a RFID system by simply not performing the mapping step. Thus, the RFID system would be provided with the encoded data format that could then be written to the RFID transponder 14.

Numerous well-known bar code symbology algorithms exist that include source data encoding, including 93i, PDF417, MaxiCode, Data Matrix, Aztec Code, QR Code, and Code One, to name but a few. Any suitable coding scheme or bar code symbology that includes source data encoding may be chosen for use with the present invention. If the RFID transponder 14 stores less than 40 bytes, then 93i with error correction algorithms utilizing a Reed-Solomon methodology in a prime modulus 2 GF(53), as known in the art, is preferred and the source data may be encoded as 93i codewords. GF stands for Galois Field that refers to the field of mathematics that utilizes prime numbers and corresponding finite fields that are utilized in error correction schemes. The 93i is a method of encoding information and mapping into bar code form, but as discussed above, can also be adapted to encode source data prior to writing to the RFID transponder 14. 93i provides capabilities that are not supported by current linear symbologies such as the ability of encoding Unicode (double byte characters), the Extended Channel Interpretation (ECI) protocol, a Inked sequence, and an indication of the existence of an associated data carrier and error correction. Also, there are applications that require more efficient encoding of certain types of data than is currently available including the encodation of bytes (both for byte data and byte-wise character sets), extended and Full ASCII, and mixed alphanumeric data such as the Code 39 character set, as known in the art. A more complete description of 93i may be obtained from the International Symbology Specification-93i, developed by AIM Incorporated, and incorporated by reference into this document. Thus, the source data using 93i encoding derives all of the benefits and efficiencies of the 93i algorithms to provide data integrity and improve RFID system performance.

For RFID transponders that store larger amounts of data, existing two-dimensional bar code symbology encoding and error correction methods may be preferred, such as PDF417, Code One, or MaxiCode that utilize GF(929), GF(256), and GF(64), respectively, for the error correction algorithms, as known in the art. For the MaxiCode, a more complete description may be obtained from the International Symbology Specification-MaxiCode, developed by AIM Incorporated, and incorporated by reference into this document. Likewise, a more complete description for PDF417 and Code One may be obtained from the corresponding International Symbology Specification, available from AIM Incorporated, and incorporated by reference into this document.

The following example is provided to demonstrate both the efficiencies of data encoding and the value of error detection and correction. To encode the data (1, 2, 3, 4, 5, 6) using the encodation method and GF(256) algorithm defined in the Code One specification, the data is first compacted according to the symbology rules. Numeric digits are paired (e.g., 12, 34, 56) and converted to bytes using the formula:

Codeword=(digit pair)+130.

Therefore, the data is transformed into the following:

12→12+130=142;

34→34+130=164; and

56→56+130=186.

Thus, the original data is encoded as the three bytes 142, 164, and 186. Note that alphanumeric data can also be more efficiently encoded. The Reed-Solomon algorithm is then used to generate the appropriate number of codewords. If the RFID transponder can accommodate eight bytes, then five error correction codewords are generated. The result is 142, 164, 186, 114, 25, 5, 88, and 102. The eight bytes are then encoded into the RFID transponder. When the RFID transponder is decoded, the efficiently encoded data is expanded back to Full ASCII byte data and the error correction algorithms are utilized.

As an example, if the RFID transponder is used on a car engine and is read at every service interval, it must survive for a long period of time. Imagine reading the RFID transponder after two years and the data is read as 142, 164, 187, 111, 25, 5, 88, and 102. Note that two characters are in error (187 and 111). A conventional RFID interrogator would read the incorrect data and would not be able to determine that the data is erroneous. A system with error detection, as in the present invention, would be able to indicate that the data contains errors and the operator could then contact the manufacturer to obtain the correct data. A system with error detection and correction, also in the present invention, allows the RFID interrogator to automatically correct the corrupted data and output the data as originally programmed as 142, 164, 186, 114, 25, 5, 88, and 102. Finally, the encoded data is decoded to the original source data (1, 2, 3, 4, 5, 6). Furthermore, if the RFID interrogator has RFID transponder programmer functions, then the RFID interrogator could also correct the data in the RFID transponder by writing the original data back into the RFID transponder. This method allows correct data to be maintained on the RFID transponder for the life of the vehicle or RFID transponder.

Implicit in the example above and in the use of bar code symbology algorithms is the use of a character set other than bytes. For example in Code One, ASCII encodation is the default set for the first symbol character in all symbol sizes. ASCII, a binary code for text as well as communications and printer control, is a 7-bit code providing 128 character combinations with the first 32 of which are control characters. Because the common storage unit is an 8-bit byte and ASCII uses only 7 bits, the additional bit may be used in various ways to more efficiently encode data that is commonly used in RFID systems. For Code One, the ASCII encodation encodes ASCII data, double density numeric data, and symbology control characters. Symbology control characters include function characters, the pad character, and the switches to other code sets. ASCII data is encoded as codewords 1 to 128 (ASCII value plus 1). Extended ASCII (data values 128 to 255) is encoded using the upper shift symbology control character. The digit pairs 00 to 99 are encoded with codewords 130 to 299 (numeric value plus 130). The ASCII code assignments, along with details pertaining to this discussion, may be found in the Code One specification referenced above. By the use of character sets that are implemented using other than a byte per character, advantages and efficiencies are obtained and the unused memory may be utilized in ways such as data compaction and error detection and correction.

Additionally, specific error detection and correction methods may be tailored to the RFID transponder in order to optimize error detection and correction capability for a given RFID transponder's data content and architecture. One such method provides for tailoring a Galois Field to optimize the error correction performance for a given RFID transponder. By selecting the optimal Galois Field based on the amount of unused memory available, the degree of error correction performance can be enhanced because the unused memory will be utilized by additional error detection and correction information.

Figure 3:
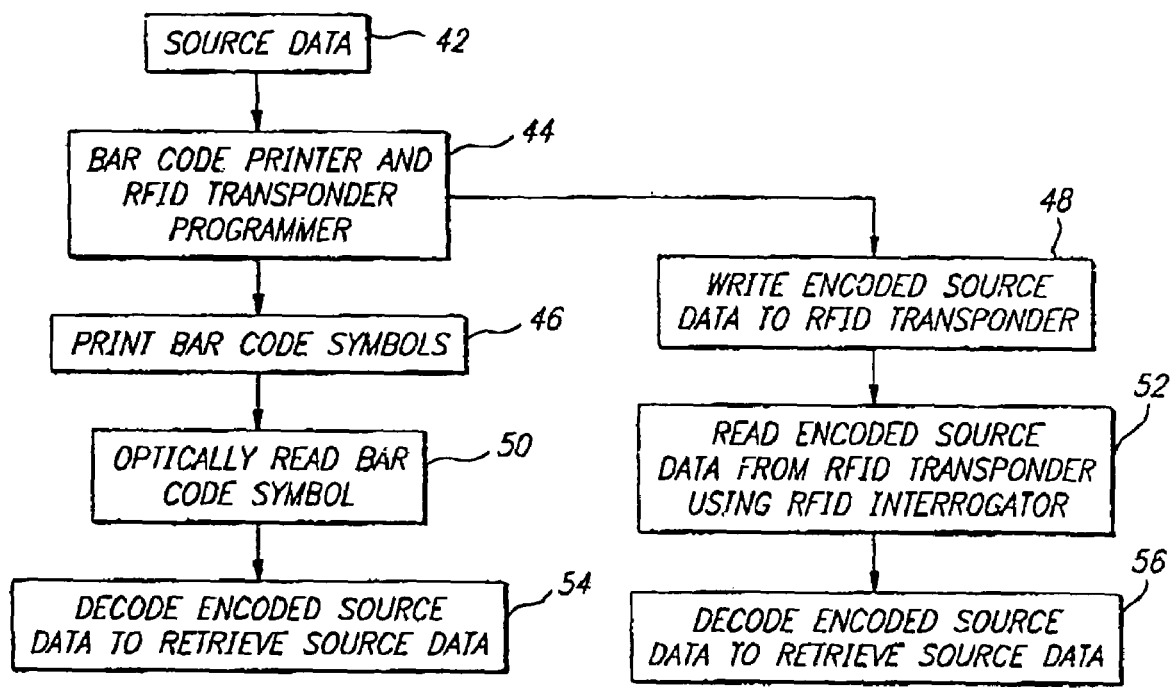
FIG. 3 is a flow chart illustrating a method and apparatus in accordance with an embodiment of the present invention for providing RFID transponder data encoding.

FIG. 3 is a flow chart illustrating a method and apparatus in accordance with an embodiment of the present invention for providing RFID transponder enhanced data encodation. The source data, shown at step 42, represents the original, unaltered data that is desired to be communicated by a RFID system. At step 44, the source data is supplied to a device comprised of a bar code printer and a RFID transponder programmer. This apparatus comprises the capabilities of current bar code printers that receive the source data, encode the source data using bar code symbology algorithms, and print the bar code symbols (step 46). However, the apparatus also includes enhanced capabilities that include encoding the source data by utilizing the same bar code symbology algorithms, but adapted to encode RFID transponder data, and then writing the encoded source data to a RFID transponder (step 48). The apparatus would have a common memory and a processor to control all of the functions related to printing bar codes or writing to RFID transponders.

The apparatus thus provides the dual function of encoding and printing bar code symbols or encoding and writing symbology codewords to a RFID transponder. Alternatively, source encoding algorithms that do not utilize bar code symbology algorithms may also be used to encode the RFID source data. If the apparatus prints bar code symbols, then the bar code symbols can then be attached to an object so that a bar code reader could later optically read the bar code symbol, step 50, and decode the encoded source data to retrieve the original source data, step 54. If the apparatus writes to a RFID transponder, the RFID transponder can then be attached to an object so that a RFID interrogator could later read the encoded source data from the RFID transponder, step 52, and decode the encoded source data to retrieve the original source data, step 56.

As discussed above, the functions of a RFID interrogator and a bar code reader may be combined within a single device, similar to the combination of a RFID transponder programmer and a bar code printer, to achieve many advantages and efficiencies. The RFID transponder programmer, bar code printer, RFID interrogator, and bar code reader may also be combined together or linked as one device to gain additional advantages. In addition, by utilizing bar code symbology algorithms, efficiencies and cost savings are achieved and risks are reduced, because the algorithms have been developed, are proven performers, and are currently in use for bar code symbols. Combining multiple applications within a given apparatus and utilizing existing data encoding methods that may include error detection and correction algorithms also reduces implementation costs. For example, items common to the devices can be combined and the redundancies eliminated, such as using a single processor to control all of the functions and a common memory to store data and programs.

It should be understood that, as discussed above, the source data could be encoded prior to the bar code printer/RFID transponder programmer apparatus, so that the apparatus may simply perform the function of printing the bar code symbol or writing to the RFID transponder. Likewise, after reading the encoded source data, the RFID interrogator may simply transfer the encoded source data to a device for later decoding prior to the user application. Furthermore, the apparatus may utilize bar code symbology algorithms or any other types of coding schemes to encode the source data in preparation of writing to the RFID transponder.

Depending upon the incorporation of the various devices and the complexity of the source encoding scheme utilized, an RFID interrogator, that determines that an RFID transponder contains corrupted data and that has error correction and RFID transponder programmer capability, may write the corrected encoded source data to the RFID transponder as shown in FIG. 2. Likewise, if the bar code reader has error correction capability and is linked with or has bar code printer capabilities, then upon detection of a damaged bar code, a new bar code may be printed in place of the damaged bar code.

Having thus described a preferred embodiment of a method and apparatus for data error detection and correction in RFID transponders, it should be apparent to those skilled in the art that certain advantages of the within system have been achieved. It should also be appreciated that various modifications, adaptations, and alternative embodiments thereof may be made within the scope and spirit of the present invention. For example, a bar code printer/RFID transponder programmer has been illustrated to show an embodiment of the present invention, but it should be apparent that the inventive concepts described above would be equally applicable solely to a RFID transponder programmer, as known in the art. The invention is further defined by the following claims.

What is claimed is:

1. A system for optically reading bar code symbology and interrogating an RFID transponder comprising:
    a bar code reader for optically reading bar code symbology;
    an RF interrogator for obtaining encoded data from an RFID transponder;
    a memory device for storing at least one program, said at least one program being adapted to decode both said bar code symbology and said encoded data and to perform data error detection and correction, wherein said function of performing said data error detection and correction comprises (i) obtaining source data, (ii) obtaining a size of an available unused memory in said RFID transponder, (iii) selecting an optimal degree of error correction performance based on said size of said available unused memory and a size of said source data; and (v) encoding said source data for storage in said available unused memory using the selected degree of error correction; and
    a processor for running said program.

2. The system of claim 1, wherein said program is further adapted to decode said bar code symbology and said encoded data using a bar code symobology coding algorithm comprising a non-Full ASCII format.

3. The system of claim 1, wherein said program is further adapted to produce said bar code symbology and said encoded data by encoding said source data.

4. The system of claim 1, wherein said program is further adapted to (i) obtain said encoded data from said available unused memory, (ii) determine whether said encoded data is corrupted, (iii) modify said optimal degree of error correction performance based on said determination, and (iv) encode said source data for storage in said available unused memory using the modified degree of error correction.

5. The system of claim 1, wherein said program is further adapted to (i) obtain said source data, (ii) define a set of numeric values, said set containing a number of members equal to a prime number or a power of a prime number, (iii) map said source data to a string of numeric values from said set, (iv) perform a mathematical algorithm on the string of numeric values to produce at least three additional numeric values; (v) combine the string of numeric values with the at least three additional numeric values; and (vi) write the resulting string of numeric values to said RFID transponder.

6. A system for printing bar code symbology and interrogating an RFID transponder comprising:
    a bar code printer for printing bar code symbology;
    an RF interrogator for writing encoded data to an RFID transponder;
    a memory device for storing at least one program, said at least one program being adapted to encode source data to generate said bar code symbology and said encoded data and to perform data error detection and correction, wherein said function of performing data error detection and correction comprises (i) obtaining said source data, (ii) obtaining a size of an available unused memory in said RFID transponder, (iii) selecting an optimal degree of error correction performance based on said size of said available unused memory and a size of said sourde data, and (v) encoding said source data for storage in said available unused memory using the selected degree of error correction; and
    a processor for running said program.

7. The system of claim 6, wherein said program is further adapted to decode said bar code symbology and said encoded data.

8. The system of claim 7, wherein said program is further adapted to decode said bar code symbology and said encoded data using a bar code symbology coding algorithm comprising a non-Full ASCII format.

9. The system of claim 6, wherein said program is further adapted to (i) obtain said encoded data from said available unused memory, (ii) determine whether said encoded data is corrupted, (iii) modify said optimal degree of error correction performance based on said determination, and (iv) encode said source data for storage in said available unused memory using the modified degree of error correction.

10. The system of claim 6, wherein said program is further adapted to (i) obtain said source data, (ii) define a set of numeric values, said set containing a number of members equal to a prime number or a power of a prime number, (iii) map said source data to a string of numeric values from said set, (iv) perform a mathematical algorithm on the string of numeric values to produce at least three additional numeric values; (v) combine the string of numeric values with the at least three additional numeric values; and (vi) write the resulting string of numeric values to said RFID transponder.

11. A system for optically reading bar code symbology, printing bar code symbology and interrogating an RFID transponder comprising:
    a bar code reader for optically reading bar code symbology;
    a bar code printer for printing bar code symbology;
    an RF interrogator for writing encoded data to an RFID transponder and reading encoded data from an RFID transponder;
    a memory device for storing at least one program, said at least one program being adapted to decode both said bar code symbology and said encoded data and to perform data error detection and correction, wherein said function of performing data error detection and correction comprises (i) obtaining source data, (ii) obtaining a size of an available unused memory in said RFID transponder, (iii) selecting an optimal degree of error correction performance based on said size of said available unused memory and a size of said source data, and (v) encoding said source data for storage in said available unused memory using the selected degree of error correction; and
    a processor for running said program.

12. The system of claim 11, wherein said program is further adapted to decode said bar code symbology and said encoded data using a bar code symbology coding algorithm comprising a non-Full ASCII format.

13. The system of claim 11, wherein said program is further adapted to produce said bar code symbology and said encoded data by encoding said source data.

14. The system of claim 11, wherein said program is further adapted to (i) obtain said encoded data from said available unused memory, (ii) determine whether said encoded data is corrupted, (iii) modify said optimal degree of error correction performance based on said determination, and (iv) encode said source data for storage in said available unused memory using the modified degree of error correction.

* * * * *